United States Patent [19]

Marshall et al.

[11] Patent Number: 5,284,698
[45] Date of Patent: Feb. 8, 1994

[54] PARTIALLY STABILIZED ZRO₂-BASED LAMINAR CERAMIC COMPOSITES

[75] Inventors: David B. Marshall, Thousand Oaks; Frederick F. Lange, Santa Barbara; Joseph J. Ratto, Newbury Park, all of Calif.

[73] Assignees: Rockwell Int'l Corp., Seal Beach; Regents of the University of California, Oakland, both of Calif.

[21] Appl. No.: 761,581

[22] Filed: Sep. 18, 1991

[51] Int. Cl.⁵ ............................................. B32B 18/00
[52] U.S. Cl. ........................ 428/216; 123/41.84; 428/212; 428/697; 428/701; 428/702
[58] Field of Search ............. 428/336, 212, 701, 702, 428/697, 216; 415/174; 123/41.84

[56] References Cited

U.S. PATENT DOCUMENTS

| | | | |
|---|---|---|---|
| 4,503,130 | 5/1985 | Bosshart et al. | 428/632 |
| 4,588,607 | 5/1986 | Matarese et al. | 415/174 |
| 4,600,038 | 7/1986 | Matsui et al. | 123/41.84 |
| 4,676,994 | 6/1987 | Demaray | 427/255.3 |
| 4,966,820 | 10/1990 | Kojima et al. | 428/701 |

OTHER PUBLICATIONS

Jones et al "Hot Corrosion Studies of Zirconia Ceramics" Surface and Coatings Tech, 32(1987) p. 349-358.

*Primary Examiner*—A. A. Turner
*Attorney, Agent, or Firm*—John C. McFarren

[57] ABSTRACT

In a Ce-ZrO₂-based laminar composite having enhanced fracture toughness, alternating barrier layers comprise a ceramic material that undergoes stress-induced phase transformation, if any, less readily than Ce-ZrO₂. Separation of the barrier layers is normally in the range of about 10-200 μm, with optimum individual barrier layer thicknesses at the lower end of the range. Powders of ceramic materials comprising the individual layers of the composite are dispersed in separate slurries. The pH of the slurries is adjusted to form coagulations in which the particles settle without mass segregation and can be consolidated to high density by centrifuging. After centrifuging, the supernatant liquid can be removed and a desired volume of another slurry can be added on top of the first layer of consolidated material. This process can be repeated indefinitely to form a consolidated structure having individual layers as thin as approximately 10 μm. The consolidated structure may be pressed, shaped, dried, and sintered to form the laminar composite. In the composite, interactions between a barrier layer and the martensitic transformation zone surrounding a crack or indentation spread the transformation zone along the region adjacent to the barrier layer. As a result, barrier layers provide large increases in toughness for cracks growing parallel or normal to the layers.

9 Claims, 2 Drawing Sheets

PARTIALLY STABILIZED ZRO$_2$-BASED LAMINAR CERAMIC COMPOSITES

GOVERNMENT RIGHTS

The United States Government has right in this invention under contract number F49620-89-C-0031 awarded by the Department of the Air Force and contract number N00014-90-J-1441 awarded by the Department of the Navy.

TECHNICAL FIELD

The present invention relates to laminar composite materials and, in particular, to laminar ceramic composites having enhanced fracture toughness.

BACKGROUND OF THE INVENTION

In ceria-partially-stabilized zirconia (Ce-ZrO$_2$, or Ce-TZP), high fracture toughness in the range of 10–14 MPa•m$^{\frac{1}{2}}$ has previously been achieved. Ce-TZP is known to undergo martensitic transformation from the tetragonal to the monoclinic phase as a result of stress. However, the elongated shapes of the stress-induced transformation zones surrounding cracks in Ce-TZP are not optimal for producing beneficial transformation toughening. In other zirconia ceramics of comparable toughness (such as magnesia-partially-stabilized zirconia (Mg-ZrO$_2$, or Mg-PSZ), for example), the transformation zone extends approximately equal distances ahead of and to the side of a crack. In contrast, the transformation zone in Ce-TZP is very elongated, extending ahead of the crack a distance of 10 to 20 times the width of the zone. The extra transformed material ahead of a crack in Ce-TZP degrades the toughness. Calculation of the crack tip shielding from transformation zones indicates that the increase in fracture toughness due to transformation shielding for the semicircular frontal zone shape characteristic of Mg-PSZ is about twice that for the elongated frontal zone characteristic of Ce-TZP.

The elongated transformation zone in Ce-TZP is thought to result from autocatalytic transformation, i.e., the sequential triggering of transformation in a grain by transformation strains in adjacent grains. Autocatalytic transformation also occurs in Mg-PSZ, as evidenced by the formation of well-defined shear bands within grains. The microstructure of Mg-PSZ may be thought of as dual scale: the individual precipitates that transform from tetragonal to monoclinic phase are lenticular in shape are lenticular in shape (approximately 300 nm in diameter), and they are contained within grains that are larger by about 2 orders of magnitude (approximately 50 μm diameter). Although each transformation band contains many autocatalytically transformed precipitates, the grain boundaries are effective barriers for arresting the propagating band. In Ce-TZP, however, the transforming units are the individual grains; there are no larger scale microstructural units. Thus, there are no large scale barriers to arrest a developing transformation band in Ce-TZP. Based on the foregoing, it is believed that substantial toughness enhancement will result if the microstructure of Ce-TZP is modified to change the shape of the stress-induced transformation zone.

SUMMARY OF THE INVENTION

The present invention relates to laminar ceramic composites and includes a method of introducing large-scale microstructural units into Ce-ZrO$_2$ (Ce-TZP) for enhancing fracture toughness of the ceramic material. These large-scale microstructural units take the form of barrier layers of materials such as Al$_2$O$_3$ or a mixture of Al$_2$O$_3$ and Ce-ZrO$_2$. Based on the foregoing background of the invention, the optimum separation of the barrier layers is believed to be approximately 10–200 μm, with optimum individual barrier layer thicknesses at the lower end of this range.

In the method of the present invention, powders of selected ceramic materials comprising the layers of the composite structure are dispersed in separate containers of water to form slurries. The pH of the slurries is adjusted to remove long range repulsive forces between the powder particles but retain short range repulsive forces. In this state of suspension, or coagulation, the particles settle readily under gravity without mass segregation and can be consolidated to higher density by centrifuging. After centrifuging, the supernatant liquid can be removed and a desired volume of another slurry can be added on top of the first layer of consolidated material. This process can be repeated indefinitely to form a laminar composite structure comprising alternating layers of different ceramic materials. Laminar composites having layers as thin as about 10 μm have been fabricated using this colloidal method of the present invention to consolidate the ceramic powders.

Controlled crack growth experiments and indentation experiments have been used to investigate the influence of barrier layers on crack tip transformation zones and fracture toughness in laminar composites of the present invention. Strong interactions between these layers and the martensitic transformation zones surrounding cracks and indentations have been observed. In both cases, the transformation zones spread along the region adjacent to the barrier layer. The presence of barrier layers thus leads to large increases in toughness and extensive R-curve behavior. This enhanced fracture toughness was observed for cracks growing parallel to the layers as well as for those that were oriented normal to the layers.

A principal object of the present invention is the fabrication of improved laminar ceramic composite materials. A feature of the invention is the use of a colloidal technique combined with centrifuging to consolidate layers of ceramic powders into a laminar composite. An advantage of the invention is fabrication of thin barrier layers of material that modify the stress-induced autocatalytic transformation at crack tips to enhance the fracture toughness of ceramic materials.

BRIEF DESCRIPTION OF THE DRAWINGS

For a more complete understanding of the present invention and for further advantages thereof, the following Detailed Description of the Preferred Embodiments makes reference to the accompanying Drawings, in which.

DETAILED DESCRIPTION OF THE PREFERRED EMBODIMENTS

Composites of $ZrO_2$-based ceramic have been fabricated using a colloidal technique of the present invention to produce a laminar structure having one or more barrier layers. The barrier layers comprise materials such as $Al_2O_3$ or a mixture (typically 50% by volume) of $Al_2O_3$ and Ce-$ZrO_2$. The method comprises sequential centrifuging of slurries containing suspended particles of ceramic powders to form the layered structure, followed by forming (optional), pressing, drying, and sintering at temperatures up to about 1600° C. An aqueous electrolyte (i.e., a salt such as $NH_4NO_3$ or $NH_4Cl$, for example) can be used to produce short range repulsive hydration forces and to reduce the magnitude of the longer range electrostatic forces between the particles suspended in the slurry. This condition produces a weakly attractive network of particles that prevents mass segregation during centrifugation. Because of the lubricating action of the short range repulsive forces, the particles can be packed to a high consolidation density.

The relative densities of the $Al_2O_3$ and Ce-$ZrO_2$ powders consolidated separately using this colloidal technique were approximately 60 and 50 volume %, respectively. The larger shrinkage of the Ce-$ZrO_2$ during subsequent sintering caused cracking in some layered composites that contained pure $Al_2O_3$ layers (the exceptions being some thin layers with thickness less than about 30 μm). This contraction mismatch was minimized by using the mixed composition of 50 volume % $Al_2O_3$ and Ce-$ZrO_2$ instead of pure $Al_2O_3$ for most specimens. Optical micrographs of typical layers of $Al_2O_3$/Ce-$ZrO_2$ within a matrix of Ce-$ZrO_2$ show reasonably uniform layers with thicknesses in the range 10 to 100 μm. A multilayered structure of alternating Ce-$ZrO_2$ and $Al_2O_3$/Ce-$ZrO_2$ layers of 35 μm thickness was produced, as illustrated schematically in FIG. 1.

Figure 1:
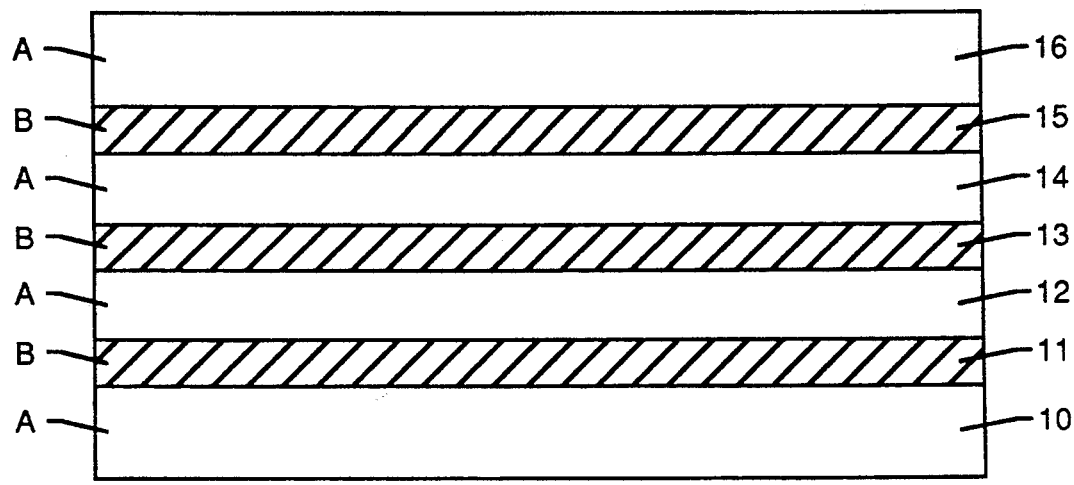
FIG. 1 is a schematic cross section of a laminar composite of the present invention.

In a preferred embodiment illustrated in FIG. 1, the material of layers A is $ZrO_2$ doped with $CeO_2$ (12 molecular %). The material of layers B is a mixture of 50% by volume of $Al_2O_3$ and $ZrO_2$ doped with $CeO_2$ (12 molecular %). The purpose of the mixed composition in the alternative example is to reduce differential shrinkage between layers A and layers B during the densification process, which involves heat treatment. The material of layers A can be any $ZrO_2$-based material that undergoes stress-induced martensitic transformation from the tetragonal to the monoclinic crystal structure. The material of layers B may be any material that 1) is chemically compatible with the material of layers A at the temperatures needed to densify material A by sintering; 2) densifies at a similar temperature and with similar shrinkage as does the material of layers A; and 3) does not undergo stress-induced phase transformation or does so less readily than the material of layers A. In addition to the $Al_2O_3$ described above, other examples of suitable barrier layer materials include the following: $ZrO_2$ with dopants such as $CeO_2$, $Y_2O_3$, MgO, and CaO in concentrations sufficient to render $ZrO_2$ either fully stabilized in the cubic structure or more resistant to stress-induced tetragonal-to-monoclinic transformation than the material of layers A; titanium diboride; silicon carbide (SiC); hafnium oxide; and mixtures of the foregoing. Although there is no upper limit to the thickness of individual layers of the laminar composite, layers with thicknesses as low as about 10 μm can be fabricated using the colloidal method of the present invention.

In the method of the present invention, ceramic powders comprising the materials of layers A and B are dispersed in separate containers of water to form slurries. Ultrasonic waves may be used to cause mixing, and the pH may be adjusted to about 2 by adding $HNO_3$. At pH 2 there are long range electrostatic repulsive forces between the powder particles that keep them well separated and dispersed. The long range repulsive forces may be removed to form a weakly attractive network that results when the particles develop a solvation layer which produces a short range, but highly repulsive force. Such particle networks can be formed by adding an indifferent salt to a dispersed slurry in which the initial, long range electrostatic repulsive potential is produced at low pH. When the concentration of the salt is $\geq 0.1M$, the particles become weakly attractive to form a coagulation due to the diminished electrostatic potential. A salt such as $NH_4Cl$ or $NH_4NO_3$ at about 0.5–2.0M concentration, for example, may be added to the slurries of ceramic powders described above to cause coagulation. In this state of coagulation, the suspended particles are not flocced (i.e., not touching or cohesive), but they settle readily under gravity, without mass segregation, and they may be consolidated to higher densities by centrifuging. Mass segregation at this step is undesirable because it causes cracking during subsequent heat treatment and densification.

To construct the laminar composite illustrated in FIG. 1, a volume of slurry needed to yield the desired thickness of material in layer 10 is placed in a container comprising an outer wall (typically cylindrical), a removeable inner Teflon ® sleeve, and a removeable bottom. The container is then placed in the swinging bucket of a centrifuge and spun at approximately 2000 g for 15 minutes. After centrifuging, the supernatant liquid is removed and a volume of slurry needed to yield the desired thickness of material in layer 12 is placed in the container. The container is centrifuged again, and the whole process repeated for each of the layers 13 through 16. As shown in FIG. 1, the composition of the slurry is alternated (or changed to a different material) for each successive layer of the composite. The process is repeated until the composite structure has the desired number of layers, each having the desired thickness and composition.

At this stage, after all the layers of the composite have been centrifuged, the consolidated laminar composite has rheological properties similar to wet clay. Before drying, uniaxial compressive stress may be applied to the structure to further increase the particle packing density. This can be accomplished, for example, by inserting a microporous filter on top of the consolidated composite while it remains in the container, and then loading in a hydraulic press at a pressure of about 4000 psi. Alternatively, the damp composite structure may be shaped in a mold or rolled out to flatten the material, for example. The flattened composite may then be rolled into a composite rod comprising alternating layers of material having a spiral cross-section. It should be apparent that other shapes and structures of the laminar composite may be visualized and formed by one having ordinary skill in the art.

After consolidation, the laminar composite is removed from the container or mold and dried at 50° C. for about 24 hours. The composite can then be packed in ZrO$_2$ powder and sintered in a furnace using a temperature treatment schedule such as the following (which is provided only as an example, and not as a limitation, of a typical treatment schedule):

| Typical Temperature Treatment Schedule | | |
|---|---|---|
| Temperature | Rate | Time |
| 20° C. to 450° C. | Constant | 2.0 Hours |
| 450° C. to 600° C. | Constant | 15.0 Hours |
| 600° C. to 1000° C. | Constant | 15.0 Hours |
| 1000° C. to 1500° C. | Constant | 10.0 Hours |
| 1500° C. | N/A | 2.0 Hours |
| 1500° C. to 1600° C. | Constant | 0.5 Hours |
| 1600° C. | N/A | 2.0 Hours |
| 1600° C. to 20° C. | Constant | 4.0 Hours |

EXPERIMENTAL RESULTS

Figure 2:
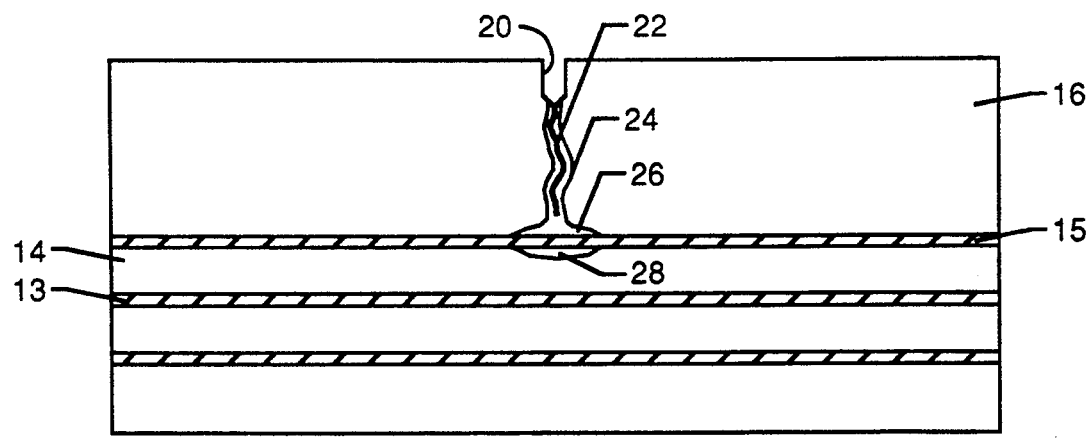
FIG. 2 is a schematic cross section of the laminar composite of FIG. 1 illustrating crack propagation and transformation zone spreading at a barrier layer of the composite.

The influence of individual barrier layers of Al$_2$O$_3$ or Al$_2$O$_3$/Ce-ZrO$_2$ on crack growth and transformation zones in Ce-ZrO$_2$ was investigated by fabricating composites containing widely spaced layers, as illustrated schematically in FIG. 2. Measurements were obtained from controlled crack growth in notched beams, fracture of smooth bars, and indentation experiments using a Vickers indenter.

Crack growth experiments with notched beams were conducted in two steps, using two different loading fixtures, which operated on the stage of an optical microscope and allowed high magnification observation of the side of the beam during loading. All experiments were done in a dry nitrogen atmosphere. The dimensions of the beams were approximately 28×6×1 mm, with an initial notch 20 of about 170 μm width and about 2 mm depth. A stable crack 22 was initiated from the root of notch 20 under monotonic loading. WC/Co flexure beams were placed in series with the test specimen to make the loading system extremely stiff and allow stable crack growth. The beams were equivalent to very stiff springs in parallel with the specimen and thus functioned as a crack arrester. To stiffen the loading system further, initial crack growth was induced without use of a load cell. After growing crack 22 for approximately 500 μm, the loading system was changed to include a load cell with conventional four-point loading through rollers in order to allow measurement of the fracture toughness (or crack growth resistance). The stress intensity factor was evaluated from the measured loads and crack lengths (obtained from optical micrographs), as is well known in the art.

Results were obtained from a specimen comprising three layers of Al$_2$O$_3$/Ce-ZrO$_2$ widely spaced ahead of notch 22, as shown in FIG. 2. After initiating stably in the immediate vicinity of notch 20, crack 22 grew unstably in layer 16 when the loading system was changed to include the load cell, and arrested approximately 20 μm before layer 15 of Al$_2$O$_3$/Ce-ZrO$_2$, which had a thickness of approximately 35 μm. The width of the transformation zone 24 over the wake of crack 22, as determined by Nomarski interference, was approximately 15 μm. However, near the tip of the arrested crack, the transformation zone 26 extended adjacent to Al$_2$O$_3$/Ce-ZrO$_2$ layer 15 for distances of more than 150 μm each side of the crack. Some transformation 28 occurred on the opposite side of Al$_2$O$_3$/Ce-ZrO$_2$ layer 15, also for a distance of 150 μm both sides of the crack plane.

Figure 3:
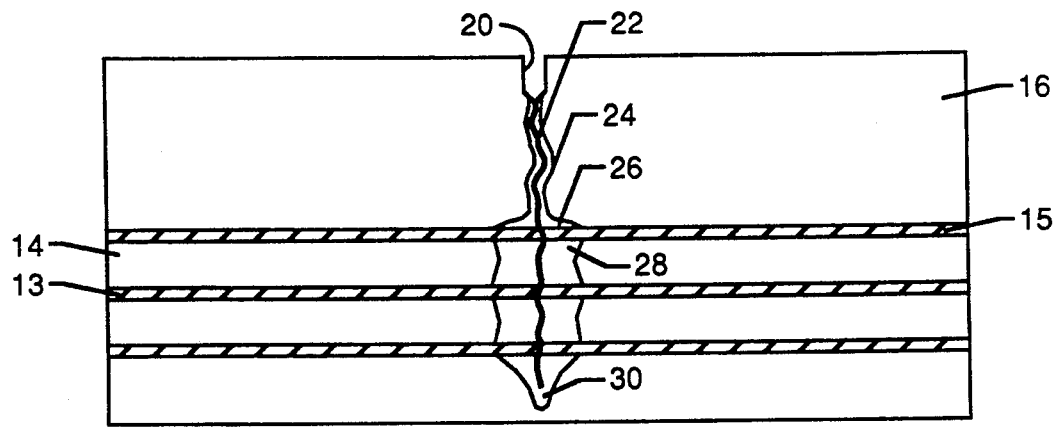
FIG. 3 is a schematic cross section showing further propagation of the crack of FIG. 2 to illustrate narrowing of the transformation zone after passing through the barrier layers.

After further loading, crack 22 grew unstably through Al$_2$O$_3$/Ce-ZrO$_2$ layer 15, into the Ce-ZrO$_2$ of layer 14, and arrested again approximately 40 μm before layer 13, which had a thickness of 70 μm. The shape of the transformation zone along layer 13 near the crack tip was similar to that of zone 26. These results indicate that the Al$_2$O$_3$/ZrO$_2$ barrier layers have a much larger effect than simply arresting the growth of a transformation zone ahead of a crack: they also promote expansion of the transformation zone outward from the side of the crack, which provides additional crack tip shielding and hence toughening. As illustrated in FIG. 3, a plurality of barrier layers produces a broadened transformation zone as crack 22 progresses through the barrier layer region. However, when crack 22 exits the barrier layer region, transformation zone 30 returns to the narrow, elongated shape characteristic of the Ce-ZrO$_2$ matrix material.

The applied stress intensity factors were calculated at various stages of of crack growth, using the measured loads and crack lengths. The fracture toughness of the Ce-ZrO$_2$ matrix was 5 MPa•m$^{\frac{1}{2}}$, whereas the stress intensity factor had to be raised to 10 MPa•m$^{\frac{1}{2}}$ to drive the crack across each barrier layer. After the crack tip passed each barrier layer, the unstable crack growth prevented continued measurement of the stress intensity factor until the crack arrested again. However, when the crack had arrested, the applied stress intensity factor decreased to approximately 5 MPa•m$^{\frac{1}{2}}$, implying that the toughening effect of each barrier layer decreased as it became part of the wake of the crack. Similar results were obtained from specimens containing barrier layers of 100% Al$_2$O$_3$ in the same Ce-ZrO$_2$ matrix.

Vickers indentations in the Ce-ZrO$_2$ matrix were surrounded by large zones of transformed material, which caused uplift of the surface adjacent to the indentations. There was no cracking caused by the indentations at loads up to 300N. The presence of a nearby Al$_2$O$_3$/Ce-ZrO$_2$ barrier layer within the transformation zone caused spreading of the zone in the region adjacent to the barrier layer, in a pattern similar to the crack tip zone 26 shown in FIG. 2. There was also transformed material on the side opposite the indentation. The presence of the Al$_2$O$_3$/Ce-ZrO$_2$ barrier layer caused substantially larger uplift everywhere on the side of the indentation that was closer to the barrier layer. The surface of the Al$_2$O$_3$/Ce-ZrO$_2$ barrier layer was depressed relative to the adjacent transformed Ce-ZrO$_2$ material. However, the Al$_2$O$_3$/Ce-ZrO$_2$ barrier layer was uplifted more than the Ce-ZrO$_2$ surface at corresponding positions on the opposite side of the indentation. This observation provides evidence that the Al$_2$O$_3$/Ce-ZrO$_2$ barrier layer caused spreading of the transformation zone adjacent to the layer in the subsurface regions as well as along the surface, and/or larger concentration of transformed material in the region adjacent to the layer.

The influence of multilayered microstructures on transformation zone shapes and toughening was investigated using a specimen containing 19 layers of alternating Ce-ZrO$_2$ and Al$_2$O$_3$/Ce-ZrO$_2$, each of 35 μm thickness, in the center of a beam of Ce-ZrO$_2$. An additional isolated 35 μm layer of Al$_2$O$_3$ was located approximately 1 mm from the multilayered region. The toughening experienced by cracks oriented normal to the layers was evaluated by growing a crack in a notched beam using the loading procedure described above. The tip of the initial crack that was introduced with the stiff loading system was about halfway between the end of the notch and the first of the multiple layers (550 μm from the notch and 440 μm from the first layer). Further loading with the more compliant loading system, which allowed continuous load measurement, caused stable growth up to and through the multiple layers. However, as the crack approached the last of the layers, it extended unstably for 1.5 mm and arrested at a position 400 μm past the isolated layer.

Figure 4:
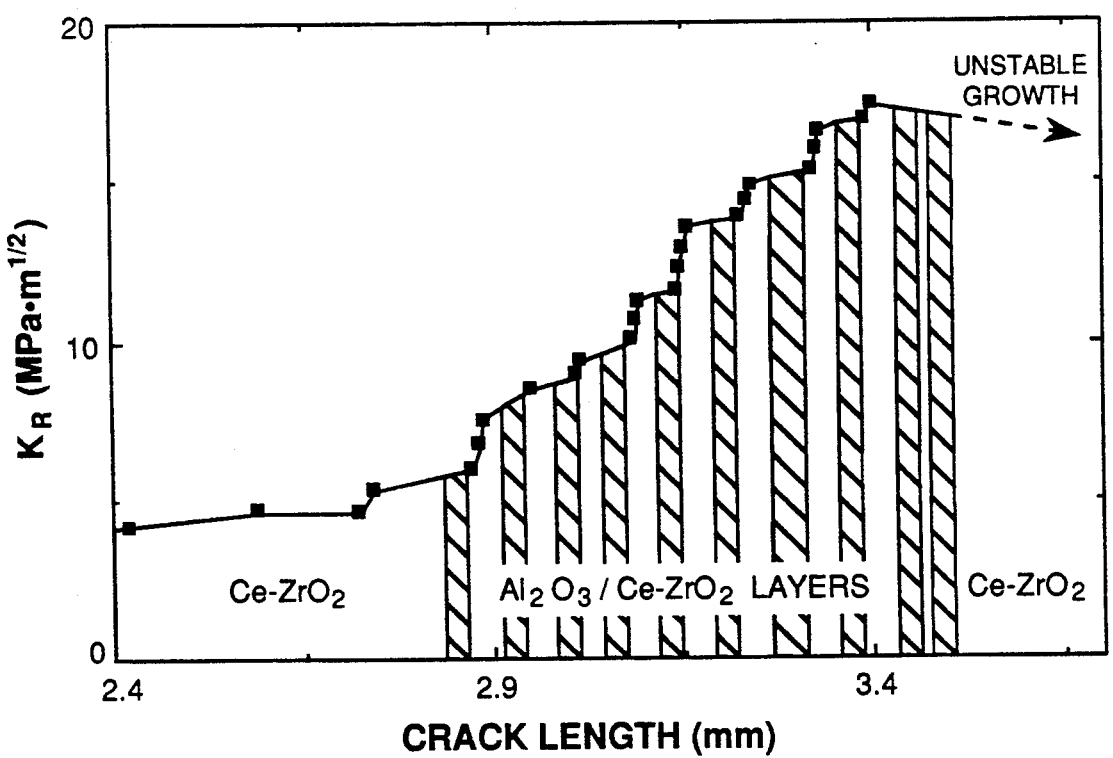
FIG. 4 is a graph plotting test results of toughness versus crack length through a laminar composite having a plurality of barrier layers.

As shown in the plot of FIG. 4, the critical stress intensity factor increased from approximately 5 MPa•m$^{\frac{1}{2}}$ in the Ce-ZrO$_2$ to 17.5 MPa•m$^{\frac{1}{2}}$ as the crack approached the end of the Al$_2$O$_3$/Ce-ZrO$_2$ barrier layer region. A corresponding increase in the size of the transformation zone surrounding the crack tip was evident in micrographs. Surface distortions due to the volume strain associated with the transformation were detected as far as 300 μm from the crack plane, whereas the zone width in the single phase Ce-ZrO$_2$ is only approximately 15 μm. After exiting the barrier layer region, the crack experienced unstable growth.

The increased width of the transformation zone within the layered region is clearly evident in optical interference micrographs in which fringes represent contours of surface uplift adjacent to the crack. Surface uplift adjacent to the crack is larger (by a factor of about 2) within the layered region than in the single phase Ce-ZrO$_2$, even though the uplift is constrained by the higher stiffness Al$_2$O$_3$/Ce-ZrO$_2$ barrier layers, and the average volume fraction of the Ce-ZrO$_2$ is lower in the layered region. Both the zone width and the magnitude of the surface uplift adjacent to the crack decreased where the crack grew unstably out of the multilayered region into the single phase Ce-ZrO$_2$, and increased again as the crack passed through the isolated Al$_2$O$_3$/Ce-ZrO$_2$ layer.

The response of cracks oriented parallel to the barrier layers was assessed by loading a double cantilever beam using another fixture on the stage of the optical microscope. The cantilever beam was cut from a region of the specimen that contained a conveniently located large processing flaw, which served as an initial sharp crack (a flat nonsintered region approximately 1 mm diameter at the edge of the multilayered area). A sequence of micrographs was obtained during loading. As the load was increased initially, a zone of material within the single phase Ce-ZrO$_2$ ahead and to one side of the crack tip transformed before the crack began to grow. With further load increase, the crack grew but was forced to cross the first layer of Al$_2$O$_3$/Ce-ZrO$_2$, presumably because of the compressive stresses due to the transformation zone on one side of the crack. The crack then grew along the first layer of Ce-ZrO$_2$ within the multilayered region, causing transformation in an increasingly wide zone of adjacent layers. The stress intensity factor was not evaluated during this test because the ends of the beam were glued into the loading fixture rather than being loaded through pins. Nevertheless, it is clear that the layers caused an enhancement of the width of the transformation zone, and hence the toughness, in this orientation as well as in the normal orientation.

The results of the foregoing experiments show that the presence of barrier layers of Al$_2$O$_3$ or Al$_2$O$_3$/Ce-ZrO$_2$ in Ce-TZP can dramatically modify the sizes and shapes of the transformation zones around cracks in a manner that increases fracture toughness. Two effects have been identified: truncation of the elongated frontal zone, which approximately doubles the toughening due to crack shielding; and the spreading of transformation zones along the regions adjacent to the barrier layers. Transformation zone spreading is believed to be driven by nontransformability of the barrier layers and/or their higher elastic stiffness. The mechanics of transformation zone spreading, however, has not been analyzed. Combination of the two transformation zone effects causes an increase in the fracture toughness of layered material by a factor of about 3.5 (from 5 MPa•m$^{\frac{1}{2}}$ to 17.5 MPa•m$^{\frac{1}{2}}$).

The Ce-ZrO$_2$ powder used in the foregoing experiments yields a base material with a fracture toughness of approximately 5 MPa•m$^{\frac{1}{2}}$ and a transformation zone size of approximately 15 μm. These are substantially less than the toughness and zone sizes reported in more transformable Ce-ZrO$_2$ materials ($K_R = 14$ MPa•m$^{\frac{1}{2}}$, and zone sizes of several hundred microns). However, despite this relatively low starting toughness, the multilayered microstructure was characterized by a crack resistance curve that went as high as 17.5 MPa•m$^{\frac{1}{2}}$, and which had not begun to saturate to a steady state value when the crack encountered the end of the layered microstructure. The peak value of $K_R$ is one of the highest toughness recorded in a ceramic material, being surpassed only by weakly bonded fiber reinforced composites, weakly bonded laminar composites, and some Mg-PSZ materials immediately after heat treatment (Mg-PSZ materials age, however, and lose some of their toughening at room temperature). Furthermore, there is potential for substantially higher fracture toughness in layered microstructures fabricated with higher toughness Ce-TZP starting materials.

The mechanisms of toughening enhancement described above are not restricted to the laminar geometry used in the foregoing experiments. Similar effects may be expected for any high-modulus, nontransforming microstructural units, such as continuous or chopped fibers or platelets, that are distributed over a spatial scale similar to that of the barrier layers. An example that has been observed is the interaction of a transformation zone around an indentation with an isolated sapphire fiber in a Ce-TZP matrix. In direct analogy with the effect of the barrier layers, the sapphire fiber caused spreading of the transformation zone and a larger overall surface uplift in the vicinity of the fiber.

The colloidal technique of the present invention may be used for fabricating layered ceramic structures other than the ZrO$_2$-based structures described above. For example: multilayered capacitors having alternate layers of dielectric materials, such as barium titanate, between metallic electrodes; multilayered actuators or transduces having alternate layers of ferroelectric ceramic material, such as PZT (lead-zirconium titanate), between metallic electrodes; and solid oxide fuel cells having alternate layers of fuel electrodes (e.g., Ni/ZrO$_2$), oxygen conducting electrolyte (e.g., Y$_2$O$_3$/ZrO$_2$), and air electrodes (e.g., La(Sr)MnO$_3$). These laminar structures may all be fabricated using variations of the method described above instead of prior art tape casing methods. The colloidal method of the present invention has several advantages over tape casting methods, such as the fabrication of smaller layer dimensions, avoiding problems associated with burning out the binder used with tape casting, and achieving better particle packing, which results in reduced sintering temperatures and the avoidance of interdiffusion between layers (caused by high-temperature sintering).

Although the present invention has been described with respect to specific embodiments thereof, various changes and modifications can be carried out by those skilled in the art without departing from the scope of the invention. Therefore, it is intended that the present invention encompass such changes and modifications as fall within the scope of the appended claims.

We claim:

1. A $ZrO_2$-based laminar composite, comprising:
    at least two layers of $ZrO_2$-based ceramic material that undergoes stress-induced martensitic transformation from a tetragonal to a monoclinic structure;
    a layer of a second ceramic material consolidated between said layers of $ZrO_2$-based material to form a barrier layer;
    said second ceramic material undergoing stress-induced transformation, if any, less readily than said $ZrO_2$-based material.

2. The laminar composite of claim 1, wherein said $ZrO_2$-based ceramic material comprises Ce-doped $ZrO_2$ ceramic material.

3. The laminar composite of claim 1, wherein said second ceramic material comprises a material selected from the group consisting of $Al_2O_3$; sapphire fibers; titanium diboride; silicon carbide; hafnium oxide; $ZrO_2$ doped with a material selected from the group consisting of $CeO_2$, $Y_2O_3$, MgO, and CaO; and mixtures of the foregoing.

4. The laminar composite of claim 2, further comprising a plurality of barrier layers formed from said second ceramic material, said barrier layers having individual thicknesses ranging from approximately 10 to 100 $\mu m$ and consolidated alternately between a plurality of said Ce-doped $ZrO_2$ ceramic layers.

5. A laminar ceramic composite, comprising:
    at least two layers of partially stabilized Ce-doped $ZrO_2$ ceramic material that undergoes stress-induced martensitic transformation from a tetragonal to a monoclinic structure;
    a layer of a second ceramic material consolidated between said layers of said partially stabilized Ce-doped $ZrO_2$ ceramic material to form a barrier layer;
    said second ceramic material undergoing stress-induced transformation, if any, less readily than said partially stabilized Ce-doped $ZrO_2$ ceramic material.

6. The laminar ceramic composite of claim 5, wherein said second ceramic material comprises a material selected from the group consisting of $Al_2O_3$; sapphire fibers; titanium diboride; silicon carbide; hafnium oxide; $ZrO_2$ doped with a material selected from the group consisting of $CeO_2$, $Y_2O_3$, MgO, and CaO; and mixtures of the foregoing.

7. The laminar ceramic composite of claim 5, further comprising a plurality of barrier layers formed from said second ceramic material, said barrier layers having individual thicknesses ranging from approximately 10 to 100 $\mu m$ and consolidated alternately between a plurality of layers of said partially stabilized Ce-doped $ZrO_2$ ceramic material.

8. A partially stabilized $ZrO_2$-based laminar ceramic composite, comprising:
    a plurality of layers of $ZrO_2$-based ceramic material that undergoes stress-induced martensitic transformation from a tetragonal to a monoclinic structure;
    a plurality of layers of a second ceramic material, said layers of said second ceramic material consolidated alternately between said layers of said $ZrO_2$-based material and having individual thicknesses ranging from approximately 10 to 100 $\mu m$;
    said second ceramic material comprising a material selected from the group consisting of $Al_2O_3$; sapphire fibers; titanium diboride; silicon carbide; hafnium oxide; $ZrO_2$ doped with a material selected from the group consisting of $CeO_2$, $Y_2O_3$, MgO, and CaO; and mixtures of the foregoing.

9. The laminar ceramic composite of claim 8, wherein said $ZrO_2$-based ceramic material comprises Ce-doped $ZrO_2$ ceramic material.

* * * * *